(12) United States Patent
Willems

(10) Patent No.: US 8,465,845 B2
(45) Date of Patent: Jun. 18, 2013

(54) METHOD AND APPARATUS FOR PRESERVING WOOD, AND WOOD PRODUCT

(75) Inventor: Wilhelmus Petrus Martinus Willems, Overloon (NL)

(73) Assignee: Firmowood Nederland B.V., Deurne (NL)

(*) Notice: Subject to any disclaimer, the term of this patent is extended or adjusted under 35 U.S.C. 154(b) by 743 days.

(21) Appl. No.: 12/520,770

(22) PCT Filed: Dec. 20, 2007

(86) PCT No.: PCT/NL2007/050678
§ 371 (c)(1),
(2), (4) Date: Jan. 15, 2010

(87) PCT Pub. No.: WO2008/079000
PCT Pub. Date: Jul. 3, 2008

(65) Prior Publication Data
US 2010/0143739 A1 Jun. 10, 2010

(30) Foreign Application Priority Data
Dec. 22, 2006 (NL) ..................................... 2000405

(51) Int. Cl.
B32B 21/04 (2006.01)
(52) U.S. Cl.
USPC .......... 428/537.1; 428/536; 427/325; 34/406; 34/408; 34/414; 34/418; 34/558; 34/559
(58) Field of Classification Search
USPC .................. 428/537.1, 536; 427/325; 34/406, 34/408, 414, 418, 558, 559
See application file for complete search history.

(56) References Cited

U.S. PATENT DOCUMENTS

| 3,646,687 A | * | 3/1972 | Berzin et al. ..................... 34/389 |
| 2002/0178608 A1 | * | 12/2002 | Leonovs ......................... 34/418 |
| 2005/0006004 A1 | | 1/2005 | Kamke et al. |

FOREIGN PATENT DOCUMENTS

| EP | 0623433 | * | 11/1994 |
| EP | 0623433 A1 | | 11/1994 |
| EP | 0936038 | * | 8/1999 |
| EP | 0936038 A2 | | 8/1999 |

OTHER PUBLICATIONS

Search Report and Written Opinion for Netherlands Patent Application No. 2000405; Jul. 19, 2007.
Search Report and Written Opinion for International Patent Application No. PCT/NL2007/050678; May 29, 2008.

* cited by examiner

*Primary Examiner* — Leszek Kiliman
(74) *Attorney, Agent, or Firm* — Jason A. Bernstein; Barnes & Thornburg LLP

(57) ABSTRACT

An apparatus for preserving wood product comprising, in one embodiment, a treatment space sealable in medium-tight manner; a vacuum pump connected to the treatment space; a steam source connected to the treatment space; a heating device which is in thermal contact with the treatment space; a dispenser for adding predetermined amounts of either a base or an acid to the treatment space; pH measuring device for determining the pH value of steam in the treatment space; and measuring and control equipment adapted to monitor at least the pH temperature and pressure inside the treatment space and to control the vacuum pump, the steam source and the heat source, and the pH by dispensing either a base or an acid. Also disclosed is a method for preserving wood. The preservation process has a relatively short process time, wherein a good preservation is realized while the mechanical strength of the wood is largely retained. The amount of waste wood material is greatly reduced.

20 Claims, 2 Drawing Sheets

US 8,465,845 B2

METHOD AND APPARATUS FOR PRESERVING WOOD, AND WOOD PRODUCT

PRIORITY CLAIM

This patent application is a U.S. National Phase of International Patent Application No. PCT/NL2007/050678, filed Dec. 20, 2007, which claims priority to Netherlands Patent Application No. 2000405, filed Dec. 22, 2006, the disclosures of which are incorporated herein by reference in their entirety.

FIELD

The present disclosure relates to a wood product and a method for preserving wood. The present disclosure also relates to an apparatus for performing the method of preserving wood.

BACKGROUND

Upgrading of wood by hydrothermolysis is known in the art. In a hydrothermolysis, wood is treated with saturated steam at a temperature between 130-220° C., wherein a hemicellulose and lignin become reactive. In a subsequent step the wood is cooled and cured by drying, wherein the reactive hemicellulose and lignin form cross-links. The final product is wood which has acquired a greater durability and fungal resistance than the untreated wood. Since all that is required for the reaction is water in the form of steam, hydrothermolysis is particularly advantageous compared to preserving methods in which the wood is upgraded with impregnating agents usually having an environmental impact.

Drawbacks of known hydrothermolysis methods are that the methods are particularly time-consuming. The wood is treated in multiple individual steps with interim cooling and heating of the wood. Time is lost here and the wood is placed under great internal stresses as a result of contraction and expansion, which result in splitting and deformation. This results in high costs due to longer production times on the one hand and to a decrease in the economic value of the wood on the other.

More rapid methods of thermal preservation are known wherein dried wood is heated to very high temperatures above 220 degrees Celsius. The drawback of these rapid methods is, however, that the mechanical strength of the product decreases greatly when compared to the starting products. Rapid thermal treatment methods with less high temperatures result in products with a reduced durability when compared to the products at higher temperatures. The known, relatively rapid methods also produce a high percentage of products of low-grade quality due to splitting and deformation, leading to a relatively high loss of material and a high amount of wasted wood

SUMMARY

The present disclosure describes several exemplary embodiments of the present invention.

One aspect of the present disclosure provides a method for preserving wood, comprising A) placing wood for treating in a treatment space; B) removing air, in particular, oxygen, from the treatment space; C) feeding steam into the treatment space, wherein the temperature of the wood is simultaneously increased, wherein the temperature is raised from 70 degrees Celsius with a temperature gradient of a maximum of 60 degrees Celsius per hour, to a temperature of at least 150 degrees Celsius; wherein the wood is heated at a temperature above 150 degrees Celsius during a reaction time of at least 10 minutes; D) polymerizing wood constituents thermally activated in step C by removing moisture from the wood up to a moisture content lower than 5% at a temperature of at least 130 degrees Celsius; and, E) cooling the wood, wherein the moisture content of the wood is simultaneously increased to at least 7% by weight, in the temperature path below 140 degrees.

Another aspect of the present disclosure provides a preserved wood product produced by the method comprising A) placing wood for treating in a treatment space; B) removing air, in particular, oxygen, from the treatment space; C) feeding steam to the treatment space, wherein the temperature of the wood is simultaneously increased, wherein the temperature is raised from 70 degrees Celsius with a temperature gradient of a maximum of 60 degrees Celsius per hour, to a temperature of at least 150 degrees Celsius, wherein the wood is heated at a temperature above 150 degrees Celsius during a reaction time of at least 10 minutes; D) polymerizing wood constituents thermally activated in step C by removing moisture from the wood up to a moisture content lower than 5% at a temperature of at least 130 degrees Celsius; and E) cooling the wood, wherein the moisture content of the wood is simultaneously increased to at least 7% by weight, in the temperature path below 140 degrees.

A further aspect of the present disclosure provides a an apparatus for preserving wood, comprising A) a treatment space sealable in medium-tight manner; B) a vacuum pump connected to the treatment space; C) a steam source connected to the treatment space; D) a heating device which is in thermal contact with the treatment space; E) a dispenser for adding predetermined amounts of either a base or an acid to the treatment space; F) pH measuring device for determining the pH value of steam in the treatment space; and G) measuring and control equipment adapted to monitor at least the pH temperature and pressure inside the treatment space and to control the vacuum pump, the steam source and the heat source, and the pH by dispensing either a base or an acid.

One feature of the present disclosure provides a rapid preservation of wood with relatively little loss in mechanical strength.

The present disclosure provides a method for preserving wood, comprising the processing steps of: A) placing wood for treating in a treatment space, B) removing air, in particular, oxygen, from the treatment space, C) feeding steam to the treatment space, wherein the temperature of the wood is simultaneously increased, wherein from a temperature of 70 degrees Celsius the temperature is raised with a temperature gradient of a maximum of 60 degrees, preferably between 30-50 degrees Celsius per hour, to a temperature of at least 150 degrees Celsius; wherein the wood is heated at a temperature above 150 degrees Celsius during a reaction time of at least 10 minutes; D) polymerizing wood constituents thermally activated in step C) by removing moisture from the wood up to a moisture content of between 3 and 5% at a temperature of at least 130 degrees Celsius, and E) cooling the wood, wherein the moisture content of the wood is simultaneously increased to at least 7% by weight, preferably between 7-8%, in the temperature path below 140 degrees.

The starting temperature of the wood in step A is normally the ambient temperature, usually between 15 and 25 degrees Celsius. In the starting situation, the wood generally has a moisture content of between 10-18% by weight.

The removal of air, in particular, oxygen, from the treatment space in step B can, for instance, take place by displacement of air by an inert gas such as nitrogen or argon, or by steam. If air is not removed, oxygen from the air can produce unwanted reactions during the preservation process. The best results are achieved if the oxygen is removed by creating a vacuum in the treatment space.

In step C steam is fed to the treatment space. If a vacuum has been created in the treatment space in step B, the steam can be used to supplement the vacuum. The temperature of the wood is simultaneously increased at a rate of between 20-60 degrees Celsius per hour, preferably approximately 40 degrees Celsius per hour, to a temperature of at least 150 degrees Celsius. Deformations and damage to the wood are prevented by raising the temperature gradually. Up to a temperature of 70 degrees Celsius, the rate of heating can be higher than 40 degrees Celsius per hour. Above 70 degrees, however, heating rates higher than 40 degrees per hour can be detrimental to the wood. Above 150 degrees, activation reactions of wood constituents take place in the wood at a sufficiently high speed, wherein a reaction time of at least 10 minutes is required in order to eventually achieve a good preservation of the wood. The reaction time is preferably at least 30 minutes. Unwanted reactions can take place in the wood at temperatures above 220 degrees Celsius. The temperature is preferably held between 150-220 degrees Celsius during the reaction time. At higher temperatures, reactions generally proceed more rapidly so that the reaction time can be shortened. A minimum reaction time of 10 minutes does, however, ensure a good result.

The wood activated by the heating with steam in step C is then polymerized in step D by removing moisture from the wood up to a moisture content lower than 5% by weight, preferably between 3 and 5% by weight, at a temperature of at least 130 degrees Celsius. This is possible, for instance, by gradually decreasing the vapour pressure and/or increasing the wall temperature of the treatment space in order to achieve a combination of vapour pressure and temperature whereby wood with a moisture content of 3 to 5% by weight is in hygroscopic equilibrium.

In step E the polymerization reaction of step D is stopped by reducing the temperature to below 140 degrees Celsius, preferably to below 100 degrees Celsius, and then further to room temperature. The moisture content of the wood is simultaneously increased to at least 7% by weight, preferably 7 to 8% by weight. Deformations during the continuous cooling are hereby prevented. During the cooling, the vapour pressure of water in the treatment space is adjusted to the value at which wood with a moisture content of 7% to 8% is in hygroscopic equilibrium. The wood is then conditioned for final processing and further manufacturing of wooden products.

It has been found that the wood has a good increased resistance to fungal damage following this treatment, while the mechanical strength decreases on average by only 10% to 15%, this being much lower than in the known rapid methods at high temperatures. Waste of wood components due to damage by, for instance, splitting is also exceptionally low.

In one exemplary embodiment of the method, a step F is performed between steps C and D wherein the heated wood is compressed. Compression results in a wood product with a greater density.

It is advantageous if the steam has a maximum degree of saturation of 95% during step C. The degree of saturation is the percentage relative to 100% saturated steam at the same pressure and temperature. This produces a better wood product and, in particular, less splitting than a comparable process in which saturated steam is used. A significant factor here is probably that condensation of water is largely prevented.

At least a part of the oxygen is preferably removed in step B by placing the treatment space under reduced pressure. Placing the treatment space under reduced pressure (creating a vacuum) is found to be a more rapid and effective method of removing oxygen than other methods, such as displacing air by means of nitrogen or steam. Creating a vacuum moreover simplifies control of the process. The degree of pressure decrease can be determined using a simple pressure gauge and is a reliable measure of the quantity of air, and thereby oxygen, removed.

In another exemplary embodiment, the reduced pressure is lower than 13 kPa. This results in a proper removal of oxygen from the treatment space. During the reduced pressure, the wall temperature of the treatment space can optionally be increased to 50-70 degrees Celsius for an even better removal of oxygen. The time required for the process is moreover shortened since a start is already made with pre-heating for the subsequent processing step C.

During step C the pH of the steam is preferably adjusted to a value between 3.0 and 6.0 by adding a base and/or an acid. Acids which result during heating with steam (in particular, acetic acid) are neutralized by adding a base, and this is found to provide an improved product wherein corrosion of metal components of the apparatus used is also less than at a pH below 3.0. Excess of added base can be balanced by adding an acid. Furthermore, at a pH below 3.0, the reactions are accelerated such that the reactions are difficult to keep under control. At a pH higher than 6.0, the desired acid hydrolysis reaction proceeds too slowly. At a basic pH (higher than 7.0), acid hydrolysis does not occur while basic hydrolysis does, which results in undesirable products. Contrary to other wood treatment methods, the base is not used to actually treat the actual wood but only to neutralize the volatile acids resulting from the heat treatment of the wood. The amounts of base needed are, therefore, much smaller than by base treatment of woods, and also the products obtained are significantly different.

The pH of the steam is determined by collecting and measuring a condensate of the steam using a pH-meter which is commercially available. A dosed quantity of base can be supplied subject to the measured value. Preferably, a volatile base and a volatile acid are used, as volatile bases and acids readily spread in the treatment space and react rapidly, leading quickly to the predetermined pH of steam in the treatment space. Non-volatile basic or acidic compounds, such as sodium hydroxide, leave a solid residue on the wood. Examples of volatile bases are ammonia ($NH_3$), and volatile lower alkyl amines having from 1-6 carbon atoms, in particular, methylamine, ethylamine, n-propylamine, i-propylamine, diethylamine, triethylamine and diisopropylamine. Examples of volatile acids include carbon dioxide, hydrochloric acid, or lower alkyl acids having 1-3 carbon atoms, including formic acid, acetic acid and propanoic acid. Volatile bases or acids that already are gaseous may be dispensed from a pressurized container by a simple automated valve. Volatile bases and acids with a higher boiling temperature may be introduced using an inert carrier gas, such as nitrogen or argon.

The best balance between reaction rate and controllability is obtained if the pH is held between 4.2 and 4.7 during the reaction time.

It is recommended that the added base comprises ammonia. Ammonia ($NH_3$) is a volatile base which can be easily removed again as gas without leaving residue on the wood. Ammonia can be easily dispensed from a pressurized container.

Preferably, the added acid is carbon dioxide. Carbon dioxide can be added from a pressurized container and does not leave a residue on the wood. Moreover, corrosion problems associated with acids are virtually non-existent when carbon dioxide is used.

It is preferred if during step C the pH is monitored and maintained at a value between 3.0 and 6.0, preferably between 4.2 and 4.7, by adding a base and/or an acid. Thus, the process and the quality of the resulting product are optimized.

In step C the reaction temperature is preferably held between 160 and 190 degrees Celsius. At this temperature a good preservation is realized in combination with a minimal loss of mechanical strength.

In yet another exemplary embodiment, the wood has a temperature higher than 150 degrees Celsius for between 10 and 60 minutes during step C. At the reaction temperature above 150 degrees Celsius, a thermal activation of the wood constituents lignin and hemicellulose occurs for such a time, while excessive depolymerization of wood constituents is avoided by limiting the reaction time. Wood temperature can be monitored by inserting a thermometer between the wood parts in the treatment space.

During step C the steam preferably has a pressure of at least 4 bar. Heat and water are transferred rapidly to the wood at such a pressure. Step C is preferably performed at a steam pressure between 4 and 12 bar.

Another feature of the present disclosure provides a wood product which is obtainable according to the method disclosed hereinabove. Such a wood product has a good durability combined with a mechanical strength which is a maximum of only 10-15% lower than the wood before the treatment.

Yet another feature of the present disclosure provides an apparatus suitable for performing the method disclosed hereinabove. In one exemplary embodiment the apparatus comprises a treatment space sealable in medium-tight manner, a vacuum pump connected to the treatment space, a steam source connected to the treatment space, a heating device which is in thermal contact with the treatment space, dispensing means for adding predetermined amounts of a base and/or an acid to the treatment space, pH measuring means for determining the pH value of steam in the treatment space, and measuring and control equipment adapted to monitor at least the pH temperature and pressure inside the treatment space and to control the vacuum pump, the steam source and the heat source, and the pH by dispensing a base and/or an acid. The method disclosed hereinabove can be performed using such an apparatus. The apparatus can herein be programmed optimally for the treatment of determined types of wood. It is advantageous if the apparatus also comprises a device for adding a base and/or an acid, wherein the measuring and control equipment is also adapted to measure the pH of a condensate in the treatment space.

Preferably, the measuring and control equipment is programmed to maintain the pH in the treatment space at a predetermined value by adding base or acid by activating the dispensing means. During the treatment according to the method disclosed hereinabove, the pH can hereby be readily monitored and, in the case of acidification, easily increased by adding base. Excess base can be balanced by adding an acid. Hence it is relatively easy to maintain a predetermined pH value within the treatment space. The base is, for instance, ammonia, and the acid is, for instance, carbon dioxide, which can be added as an aqueous solution or as a gas dispensed by means of a dispensing device such as an automated valve.

In one exemplary embodiment, the apparatus also comprises homogenizing means for spreading the steam homogeneously over the treatment space. Such homogenizing means improve homogenous treatment of the wood. Also the monitoring of temperature and pH are more accurate. For instance, adding a predetermined amount of base or acid more rapidly results in a homogenously adjusted pH in the treatment space when homogenizing means are used. Preferably, at least part of the homogenizing means are located adjacent to the dispensing means. The homogenizing means may, for instance, be a mechanical ventilator.

In another exemplary embodiment, the steam source includes a container for water comprising heating means. Such means allow for an easy way of generating steam. Preferably, also the temperature within the container for water is monitored in order to precisely control water evaporation.

In a preferred apparatus, the treatment space is bounded by a double wall provided with thermally conducting oil. The temperature inside the treatment space can hereby be readily controlled and kept homogeneous. The thermal oil is situated between the two walls of the double wall.

The apparatus according to the present disclosure is preferably programmed for performing a method as disclosed hereinabove. The apparatus can be provided for this purpose with a computer with which the measuring and control equipment is read and the vacuum pump, the steam source and the heat source and possible other components are controlled.

BRIEF DESCRIPTION OF THE DRAWINGS

Various aspects of the present disclosure are described hereinbelow with reference to the accompanying figures.

DETAILED DESCRIPTION

Figure 1:
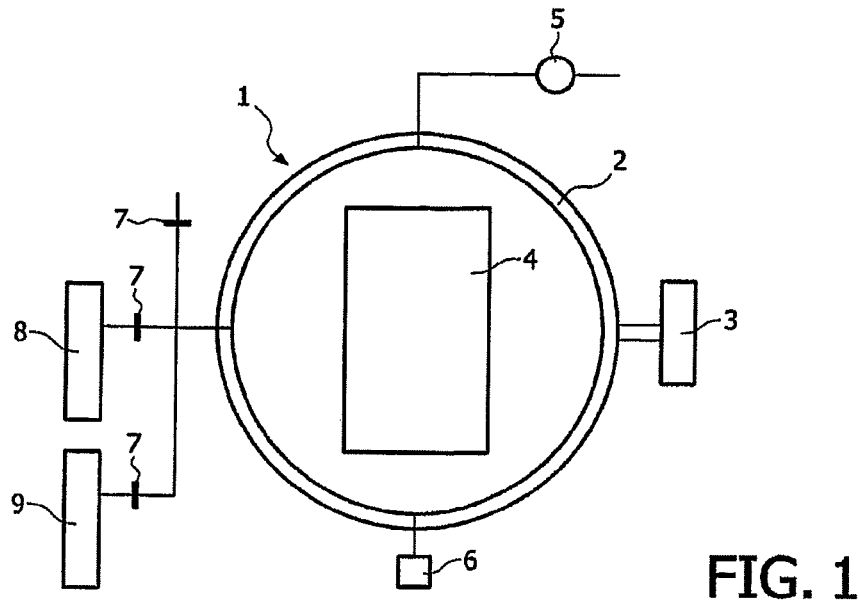
FIG. 1 shows a schematic view of one exemplary embodiment of an apparatus according to the present disclosure.

FIG. 1 shows a treatment space 1 filled with wood parts 4. The treatment space 1 is provided with a double wall 1 in which thermally conducting oil 2 is arranged. Connected to the treatment space is a vacuum pump 5 with which the air pressure in the sealed treatment space can be reduced to 10 kPa (abs) in order to remove air from the space 1 and thereby reduce undesirable chemical reactions of oxygen with wood components which can result in permanent loss of mechanical strength of wood4. Steam from a steam generator 8 can then be fed to vacuumized treatment space 1 via a control valve 7, wherein the temperature and pressure in treatment space 1 is adjusted such that it is unsaturated, with a degree of saturation of a maximum of 95%. Both the wall temperature and the wood temperature remain at least several degrees Celsius higher than the vapour dew point temperature at all times by a thermostat and heating device in order to avoid condensation anywhere in the treatment space. The rise in temperature is limited to 20 to 60 degrees Celsius per hour in order to achieve the required uniformity of temperature over the whole volume, most preferably approximately 30-50 degrees Celsius per hour. Lower temperature increase rates are easier to control, whereas a higher increase rate shortens the procedure time. During the whole heating phase, the steam in treatment space 1 remains below 95% saturation relative to the saturation at that temperature. The measuring and control equipment 6 comprises thermometers for vapour temperature and wall temperature, a pressure gauge and a pH meter. Condensation of water from the steam can result in unwanted variation in water contents in treatment space 1. In order to prevent condensation, the wall temperature is held above the temperature of steam inside the boiler 1.

As the temperature increases, in particular, from 130 degrees Celsius and, in particular, from 150 degrees Celsius, degradation reactions of hemicelluloses and lignin take place in the wood at a sufficiently critical speed. Organic acids (for instance, acetic acid), aldehydes (for instance, fururals, such as hydroxymethylfurfural) and monomeric sugars (for instance, xylose) result here among others. Lignin will then partially depolymerize. The extent to which the degradation reactions take place is determined by, among other factors, the chemical composition of the wood and further by the controllable process conditions:

the highest temperature reached (typical values are respectively 160 to 190 degrees Celsius),
the reaction time at this temperature (10 to 60 minutes),
the pressure (4 to 12 bar),
the pH (3.0 to 6.0), and
the relative humidity of the steam.

The process conditions are optimized for each type of wood and depend partly on each other. The pH can be regulated by adding a base for the purpose of neutralizing released organic acids. In the shown exemplary embodiment, the base is ammonia which is fed as a gas from a pressure cylinder 8, wherein the pH is measured in a pH meter 6 which measures the pH of a condensate of the steam.

After the reaction time has ended, most degradation products are still situated in the wood. The wood is then in a soft state, at or above the glass temperature. The wood can optionally be compressed in this phase for the purpose of compaction thereof by means of pressure means which are not shown here.

In the subsequent process, the reaction products are linked together again under dry conditions. The wall temperature is here maintained or increases slightly, while the relative humidity decreases gradually by discharging gas from the boiler. The equilibrium moisture content decreases in controlled manner such that the wood dries gradually and uniformly to a moisture content of 3 to 5%. The polymerization of the degradation products comes about as this drying progresses, wherein the material strength is restored. Finally, the wood must be cooled in a controlled manner, wherein the equilibrium moisture content is raised again to 7-8% by weight from 100 degrees Celsius (or another temperature, well below 140 degrees Celsius) in order to condition the wood for subsequent final processing.

It is found that the wood has an increased fungal resistance after this treatment, while the mechanical strength decreases by a maximum of 10% to 15%.

Figure 2:
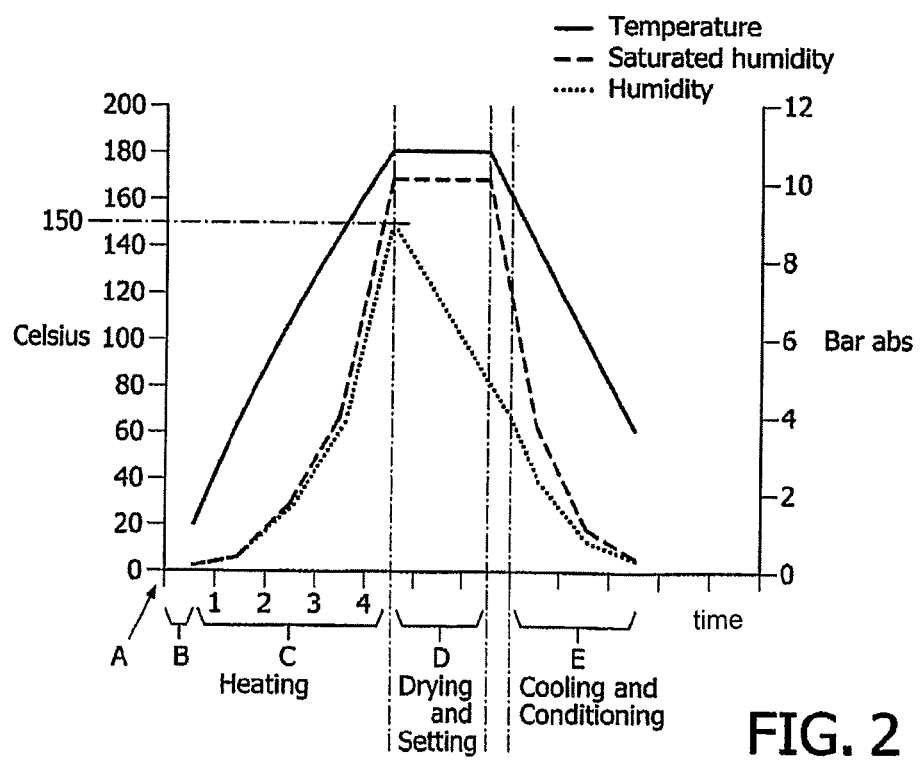
FIG. 2 is a graph of the progression of various reaction parameters during the process of the preservation of wood according to one method of the present disclosure.

FIG. 2 shows a schematic example of the progression of various reaction parameters during the preservation of wood according to the present disclosure. The shown reaction is optimized for spruce wood (*Picea Abies*) but can be adapted for use with other types of wood, such as pinewood (*Pinus Sylvestris*). The wood is placed in a treatment space in wood parts (planks) with a thickness of about 25 mm, as shown in FIG. 1. With modifications to reaction times, the method can optionally be adapted to other thicknesses of the wood parts, wherein the times for thicker wood parts will generally be longer. The temperature and vapour pressure of steam are regulated by a programmed control unit and adjusted if necessary on the basis of the measured values. The parameters (temperature in degrees Celsius, pressure in bar) are plotted against the time in hours. The saturation pressure of steam is also indicated at the temperature, wherein the graph shows that the vapour pressure of the steam in the treatment space is held below 100% saturation during the treatment. Condensation of water in the treatment space is hereby prevented.

In step A the wood for treating is placed in the treatment space and vacuum is then created in step B). During the creation of vacuum, the boiler can already be pre-heated to 70 degrees Celsius for additional time-savings. In step C steam is subsequently supplied and the temperature is simultaneously increased from 20 to 180 degrees in a period of 4 hours (40 degrees per hour), wherein the wood is at a temperature higher than 150 degrees for a reaction time of about 15 minutes. The pressure herein rises to about 9 bar, wherein the steam is held at all times below the saturation pressure. The high steam pressure serves to accelerate the hydrolysis reaction, as well as stabilizing the moisture content of the treated wood. The pressure is then reduced in step D and steam is thus discharged by discharging steam at 180 degrees, whereby water is discharged and the wood constituents activated in step C are polymerized, wherein cross-links occur between, for instance, lignin and hemicellulose. At the shown combination of temperature and vapour pressure, a hygroscopic equilibrium between the wood and the vapour is achieved wherein the moisture content of the wood is lower than 5% by weight. In step E the polymerization is then stopped by cooling and steam is supplied again, wherein the hygroscopic equilibrium is such that the moisture content of the wood is between 7 and 8% by weight. The wood is hereby conditioned for further treatment. The produced wood is particularly durable and fungal-resistant, and also has a mechanical strength which is no more than 10-15% lower than the starting material. The whole process is completed within 10 hours. The known slow processes for preservation take at least a day and are comparable in respect of durability, but display more damage, such as splitting, whereby the mechanical strength can decrease to less than 80%. The known rapid preservation processes, with temperatures of 240 degrees Celsius, likewise produce an inferior product due to brittleness and a greatly reduced mechanical strength. As a side-effect, the wood treated according to the present disclosure also shows a darkening in colour appearance.

Figure 3:
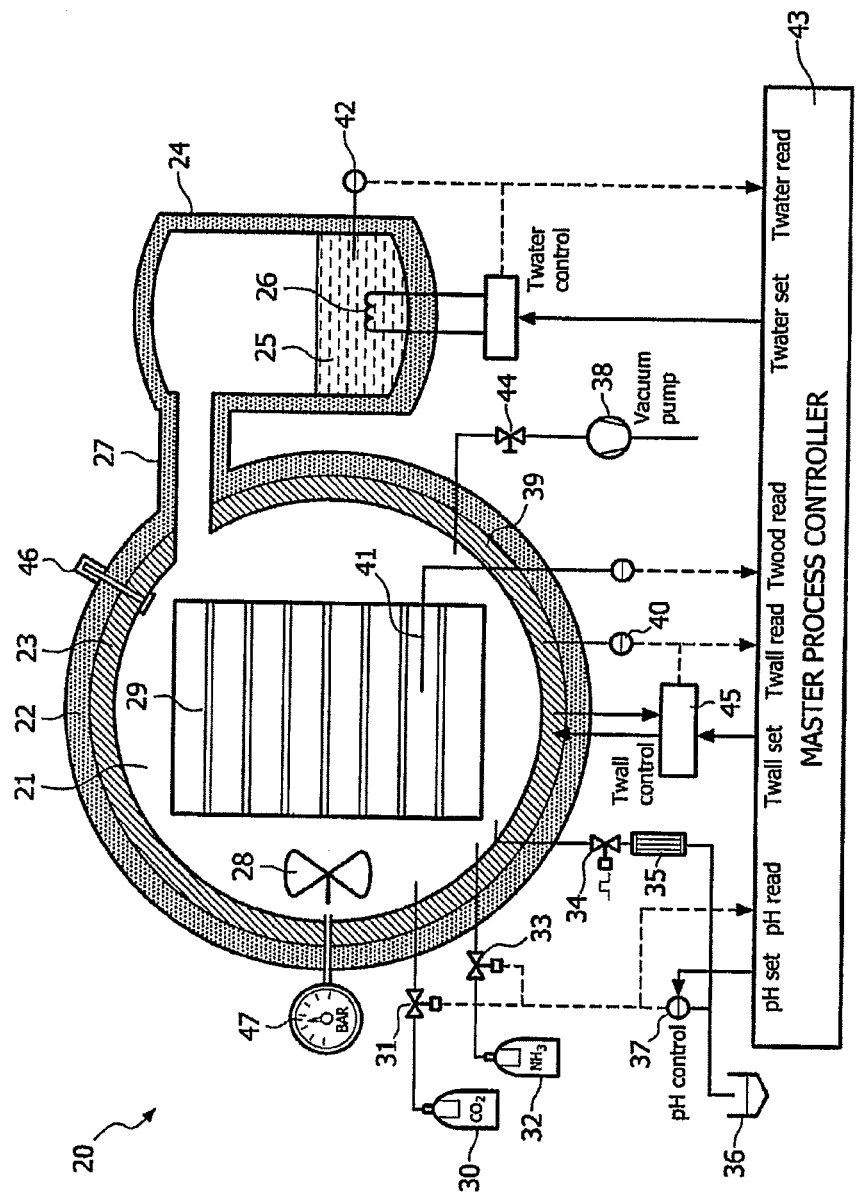
FIG. 3 shows a schematic view of another exemplary embodiment of an apparatus according to the present disclosure.

FIG. 3 describes another exemplary embodiment of an apparatus 20 according to the present disclosure. The treatment space 21 is confined by a thermally isolated outer reactor wall 22 and a thermally conducting inner reactor wall 23 which is filled with a thermally conductive oil. The treatment space 21 connects to a water container 24 containing water 25 that is heated by heating means 26 in order to generate steam, which is led to the treatment chamber 21 through a steam channel 27. The amount of water should be sufficient for achieving the desired steam pressure in the reactor chamber 21, taking into account the additional water consumed by hydrolysis reactions and the amount of water adsorbed by the wood. The container is sufficiently large to store the initial amount of water plus the amount released by condensation reactions, dehydration reactions and drying. The reactor chamber 21 is provided with a mechanical stirrer 28 used to homogenize the generated steam and volatile reaction products leading to a homogenous exposure of the treated wood parts 29. The wood parts 29 are preferably spaced apart, preferably having mutual distances of 8-15 mm, allowing for an even more homogenous treatment. If wood parts 29 are packed closely together, inner parts in a pile of wood parts 29 are less exposed than outer parts, leading to different treatment of the parts. Preferably, the reactor space 21 and the water container 24 form a closed system, in order to optimize the use of water. Preferably, the system is provided with a safety pressure valve. During the processing of the wood, the water container can be used as a cold spot wherein the water container 24 has a temperature lower than the reactor space 21 in order to ensure that water condenses in the water container and not in the reactor space 21 where it could possibly condense on the wood 29. For safety reasons, the reactor space 21 is provided with at least one standard safety pressure release valve set at a pressure below the maximum pressure the reactor walls 22, 23 can withstand. Under operating conditions according to the present disclosure, the pressure typically ranges from vacuum to a maximum of approximately 12 bar, hence the safety pressure release valve could, for instance, be set at 14 bar. The pressure inside the reactor space 21 can be monitored by a standard pressure meter 47 covering the operating range.

The reactor space 21 also connects to a first pressurized cylinder 30 comprising carbon dioxide ($CO_2$) which is connected through a first automated dispensing valve 31. Carbon dioxide may be used to lower the pH in the reactor as carbon dioxide acidifies steam. The apparatus 20 also comprises a second pressurized cylinder 32 of ammonia ($NH_3$) also connected to a second automated dispensing valve 33. Having the possibility to add predetermined amounts of acid or base may be used to maintain the pH at a predetermined value during the treatment according to the present disclosure. The pH is monitored by taking samples of the steam in the reactor space 21 by temporarily opening a sample valve 34, condensing the sampled steam in a condensator 35, and collecting the condensed steam 36 for pH measurement using regular electrochemical pH measurement equipment 37.

The reactor chamber is also provided with a vacuum pump system 38 for evacuating the reactor chamber, in particular, for removing oxygen gas. The vacuum system 38 optionally includes a pressure meter for monitoring pressure within the chamber. Instead of the optional pressure meter, it is also possible to rely on temperature and pH measurements only.

The apparatus 20 is provided with heating means 45 for heating the reactor chamber 21, and a temperature measurement units (40, 41, 42) for the inner reactor wall 23 (unit 40), the wood 29 (unit 41) and the water 25 of the steam generator 24 (unit 42). A central control unit 43 monitors the temperature of the wood 41, the temperature of the inner reactor wall 23, the temperature of the steam water 25, the pressure within the reactor space 21, and the pH within the reactor space. The control unit 43 will then, following the preset program or manual control, adjust these parameters. For instance, pressure can be increased by turning up the heater 26 of the steam generator leading to increased steam evaporation, or the pressure can be lowered by lowering the temperature, water evaporation and/or opening the vacuum valve 44 of the vacuum system 38. The vacuum valve 44 is a three-way valve that can also be used to depressurize the reaction vessel 21 or to let air or an inert gas, such as nitrogen, into the reactor space 21 in order to remove vacuum. The temperature in the chamber 21 can be adjusted by the wall heater unit 45. pH can be lowered by adding carbon dioxide 30, or pH can be increased by adding ammonia 32.

The invention claimed is:

1. A method for preserving wood, comprising:
   A) placing wood for treating in a treatment space;
   B) removing air, in particular, oxygen, from the treatment space;
   C) feeding steam into the treatment space, wherein the temperature of the wood is simultaneously increased, wherein the temperature is raised from 70 degrees Celsius with a temperature gradient of a maximum of 60 degrees Celsius per hour, to a temperature of at least 150 degrees Celsius; wherein the wood is heated at a temperature above 150 degrees Celsius during a reaction time of at least 10 minutes;
   D) polymerizing wood constituents thermally activated in step C by removing moisture from the wood up to a moisture content lower than 5% at a temperature of at least 130 degrees Celsius; and,
   E) cooling the wood, wherein the moisture content of the wood is simultaneously increased to at least 7% by weight, in the temperature path below 140 degrees.

2. The method of claim 1, further comprising a step F between steps C and D, step F comprising:
   F) compressing the heated wood.

3. The method of claim 1, wherein the steam has a maximum degree of saturation of 95% during step C.

4. The method of claim 1, wherein at least a part of the oxygen is removed in step B by placing the treatment space under reduced pressure.

5. The method of claim 4, wherein the reduced pressure is lower than 13 kPa.

6. The method of claim 1, wherein the pH of the steam is adjusted at least during step C to a value between 3.0 and 6.0 by adding either a base or an acid.

7. The method of claim 6, wherein the pH is increased to a pH between 4.2 and 4.7.

8. The method of claim 6, wherein the added base comprises ammonia.

9. The method of claim 6, wherein the added acid is carbon dioxide.

10. The method of claim 6, wherein the pH is monitored and maintained at a value between 3.0 and 6.0 during step C by adding either a base an acid.

11. The method of claim 1, wherein the reaction temperature in step C is between 160 and 190 degrees Celsius.

12. The method of claim 1, wherein the wood has a temperature higher than 150 degrees Celsius for between 10 and 60 minutes during step C.

13. The method of claim 1, wherein the steam has a pressure of at least 4 bar during step C.

14. A preserved wood product produced by the method comprising:
   A) placing wood for treating in a treatment space;
   B) removing air, in particular, oxygen, from the treatment space;
   C) feeding steam to the treatment space, wherein the temperature of the wood is simultaneously increased, wherein the temperature is raised from 70 degrees Celsius with a temperature gradient of a maximum of 60 degrees Celsius per hour, to a temperature of at least 150 degrees Celsius, wherein the wood is heated at a temperature above 150 degrees Celsius during a reaction time of at least 10 minutes;
   D) polymerizing wood constituents thermally activated in step C by removing moisture from the wood up to a moisture content lower than 5% at a temperature of at least 130 degrees Celsius; and
   E) cooling the wood, wherein the moisture content of the wood is simultaneously increased to at least 7% by weight, in the temperature path below 140 degrees.

15. An apparatus for preserving wood, comprising:
   A) a treatment space sealable in medium-tight manner;
   B) a vacuum pump connected to the treatment space;
   C) a steam source connected to the treatment space;
   D) a heating device which is in thermal contact with the treatment space;
   E) a dispenser for adding predetermined amounts of either a base or an acid to the treatment space;

F) pH measuring device for determining the pH value of steam in the treatment space; and G) measuring and control equipment adapted to monitor at least the pH temperature and pressure inside the treatment space and to control the vacuum pump, the steam source and the heat source, and the pH by dispensing either a base or an acid.

16. The apparatus of claim 15, wherein the measuring and control equipment is programmed to maintain the pH in the treatment space at a predetermined value by adding either base or acid by activating the dispenser.

17. The apparatus of claim 15, further comprising a homogenizing device for spreading the steam homogeneously over the treatment space.

18. The apparatus of claim 15, wherein the steam source includes a container for heating water.

19. The apparatus of claim 15, characterized in that wherein the treatment space is bounded by a double wall provided with thermally conducting oil.

20. The apparatus of claim 15, adapted to:

A) place wood for treating in a treatment space;

B) remove air, in particular, oxygen, from the treatment space;

C) feed steam to the treatment space, wherein the temperature of the wood is simultaneously increased, wherein from a temperature of 70 degrees Celsius the temperature is raised with a temperature gradient of a maximum of 60 degrees Celsius per hour, to a temperature of at least 150 degrees Celsius, wherein the wood is heated at a temperature above 150 degrees Celsius during a reaction time of at least 10 minutes;

D) polymerize wood constituents thermally activated in step C) by removing moisture from the wood up to a moisture content lower than 5% at a temperature of at least 130 degrees Celsius; and E) cool the wood, wherein the moisture content of the wood is simultaneously increased to at least 7% by weight, in the temperature path below 140 degrees.

* * * * *